United States Patent [19]

Hallidy et al.

[11] Patent Number: 4,605,107
[45] Date of Patent: Aug. 12, 1986

[54] SLIP CLUTCH WITH SLIP DETECTOR AND ELECTRICAL DISCONNECT

[75] Inventors: William M. Hallidy, Glendora; Donald P. Shutt, Long Beach, both of Calif.

[73] Assignee: Western Gear Corporation, Lynwood, Calif.

[21] Appl. No.: 560,216

[22] Filed: Dec. 12, 1983

[51] Int. Cl.$^4$ ............................................. F16D 7/00
[52] U.S. Cl. ............................ 192/0.02 R; 192/0.033; 192/0.096; 192/56 C
[58] Field of Search ............ 192/0.02 R, 0.032, 0.033, 192/0.076, 0.096, 103 R, 56 C, 30 W; 361/242

[56] References Cited

U.S. PATENT DOCUMENTS

| | | | |
|---|---|---|---|
| 2,465,829 | 3/1949 | Ancet | 192/0.02 R |
| 2,533,973 | 12/1950 | Starkey | 192/56 C X |
| 2,735,976 | 2/1956 | Danly | 192/0.02 R |
| 2,753,029 | 7/1956 | Babaian | 192/30 W |
| 3,915,271 | 10/1975 | Harper | 192/0.033 |

Primary Examiner—Leonard E. Smith
Attorney, Agent, or Firm—Pretty, Schroeder, Brueggemann & Clark

[57] ABSTRACT

Apparatus for protection against damage from excessive torque loads, including a fast-acting slip clutch to limit torque transmitted between a drive motor and a mechanical load, and an automatic device to protect the slip clutch from damage due to slippage in excess of a predetermined amount for a predetermined time. A slip measurement device detects the degree of slippage in the clutch, and a timing circuit coupled to the slip measurement device disconnects power from the drive motor after the predetermined time has elapsed. In the illustrative embodiment of the invention, the slip clutch includes an input shaft, a wrapped spring in interference-fit engagement with the input shaft, and an output shaft in engagement with one end of the spring. The spring tends to unwrap from the input shaft and to slip if a torque in excess of a threshold level is transmitted.

8 Claims, 8 Drawing Figures

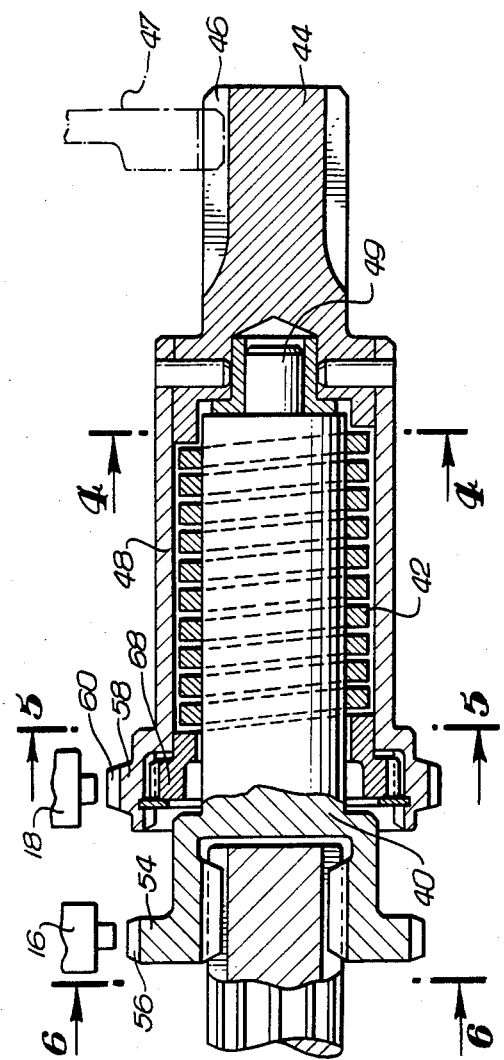
Fig. 3
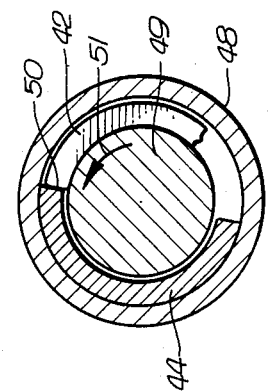
Fig. 4
Fig. 5
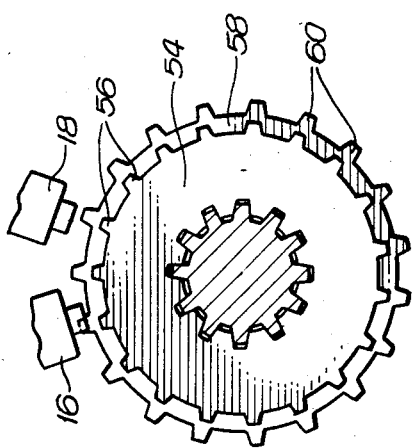
Fig. 6

SLIP CLUTCH WITH SLIP DETECTOR AND ELECTRICAL DISCONNECT

BACKGROUND OF THE INVENTION

This invention relates generally to protective devices for use in rotating machinery, and more particularly, to torque-limiting devices. In many applications of rotating machinery, it is necessary or highly desirable to limit the mechanical torque transmitting through a mechanical linkage, usually from an electric motor. Some rotating machinery, such as cable winches, are particularly susceptible to shock loading, when a cable suddenly takes up a load, or becomes snagged. In other cases, shock loading effects can result from the inertia of the rotating machinery.

One practical application in which slip clutches are subject to shock loading is that of an electric winch used in aircraft to retract a cable referred to as a static line. A static line is used in the automatic deployment of a parachute. When the line is winched back into the aircraft, possible snagging of the line on parts of the aircraft can jeopardize the safety of the crew unless there is some automatic safety device to minimize the effect of a snagged line. An electrical disconnect based on a predetermined motor current threshold does not act fast enough to be effective. The inertia of the motor and associated rotating machinery can increase the pull on the line above a safety level before the motor current reaches its cutoff limit. A mechanical disconnect device that sheds mechanical load upon reaching a torque limit may not be satisfactory either, since the line may unreel further when the load is disconnected.

There are several forms of fast-acting slip clutches that function to "clip" or limit the transmitted torque without releasing the load. When the excessive torque is no longer required, the clutch resets itself and transmits the normal rated load. Slip clutches of the prior art have a common failing in that they can tolerate slipping for only a short period of time, in some cases only a few seconds, before becoming overheated and failing.

Some slip clutches are provided with audible alarms that are actuated whenever there is clutch slippage. Examples may be found in U.S. Pat. No. 3,786,776 to Buthe et al., U.S. Pat. No. 3,756,042 to Heth et al., and U.S. Pat. No. 2,753,703 to McIntyre. Although an audible warning may be useful in some situations, it has the disadvantage of requiring operator intervention before protective action may be taken. Moreover, the alarm may not distinguish between a potentially harmful situation and one in which some degree of slippage would be desirable.

Some clutch devices measure relative clutch slippage by electrical and other means. For example, German Pat. No. 1,053,794 discloses an electrical circuit for detecting relative rotation of two parts of a clutch, and British Pat. Appln. No. 2,083,223 discloses the use of a piezoelectric device for indicating relative rotation of two parts of a clutch. Japanese Pat. Appln. No. 55-103125 discloses a variable-speed machine in which the speed of a drive shaft is monitored to determine whether there is clutch slippage. Motor current and oil pressure are also monitored in this machine, and an alarm is actuated if any abnormality is detected. Nothing in the prior art, however, addresses the specific problem inherent in all torque limiting devices, except to the extent of providing an alarm.

It will be apparent from the foregoing that there still exists a need for a slip-clutch device that not only effectively limits the transmitted torque, but also provides protection for the clutch itself. The present invention fulfills this need.

SUMMARY OF THE INVENTION

The present invention resides in a selfprotected torque limiter. Briefly, and in general terms, the invention lies in the combination of slip-clutch means, to provide an upper limit to the torque transmitted from a motor to a load, means for measuring the relative slip of the slip-clutch means, and means responsive to the means for measuring relative slip, for automatically reducing clutch slippage, to protect the clutch from damage due to prolonged slipping. In a presently preferred embodiment of the invention, the means for reducing clutch slippage includes means for disconnecting electrical power to the motor. The means for reducing clutch slippage could alternatively include means for reducing the mechanical load.

In the device of the invention, the slip clutch can operate for short periods of time without triggering shutoff of the motor. The means for disconnecting the motor includes, in its simplest form, a timer to measure the slippage period. So long as the clutch slippage returns to zero, or below some other selected threshold, before the end of some predetermined threshold period, the timer is reset and no electrical disconnection occurs.

More specifically, the invention includes a slip clutch having an input shaft coupled to a motor and an output shaft coupled to a load, and including means for limiting the transmitted torque to a predetermined maximum limit. The device of the invention also includes means for determining the speed of rotation of the input shaft, means for determing the speed of rotation of the output shaft, means for generating a control signal when the speeds of the input and output shafts have been different by a predetermined degree for a predetermined time, and means for disconnecting electrical power from the motor in response to the control signal. The specific criterion used for disconnection of electrical power will depend on details of the clutch design. By way of example, the criterion could be continuous slippage of more than some preselected percentage of input shaft speed for more than some preselected time period. The percentage and time can be selected to provide protection of the slip-clutch against overheating and possible failure.

It will be appreciated from the foregoing that the present invention represents a significant advance in the field of slip-clutch devices. In particular, the invention provides a slip clutch that effectively limits the transmitted torque for brief periods without shutting off power to the motor, but is protected against overheating and failure by a protective feature that employs relative clutch slippage and elapsed time as determinative factors. Other aspects and advantages of the invention will become apparent from the following more detailed description, taken in conjunction with the accompanying drawings.

BRIEF DESCRIPTION OF THE DRAWINGS

FIG. 3 is an enlarged fragmentary sectional view of the slip clutch shown in FIG. 2;

FIG. 4 is a sectional view taken substantially along line 4—4 in FIG. 3;

FIG. 5 is a sectional view taken substantially along line 5—5 in FIG. 3;

FIG. 6 is a sectional view taken substantially along line 6—6 in FIG. 3;

DESCRIPTION OF THE PREFERRED EMBODIMENT

Figure 1:
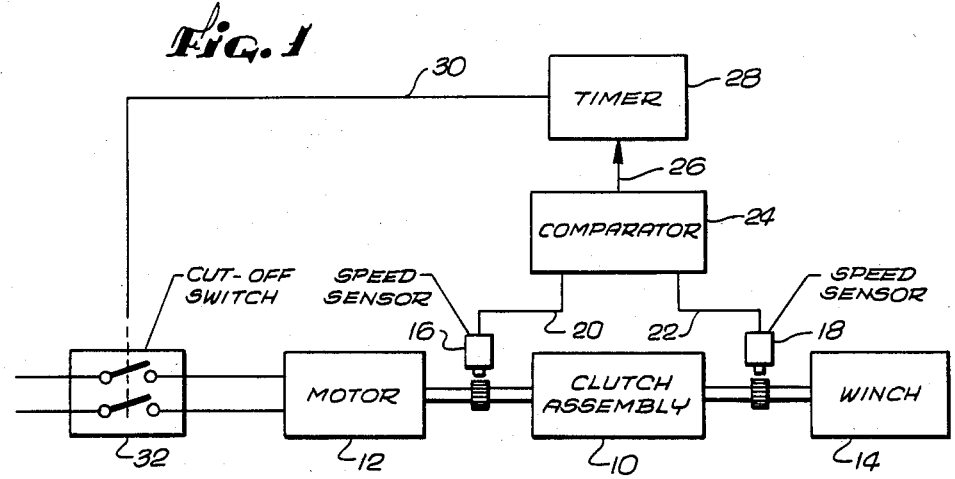
FIG. 1 is a simplified block diagram of the invention shown in relation to a motor and a rotatable winch.
Figure 2:
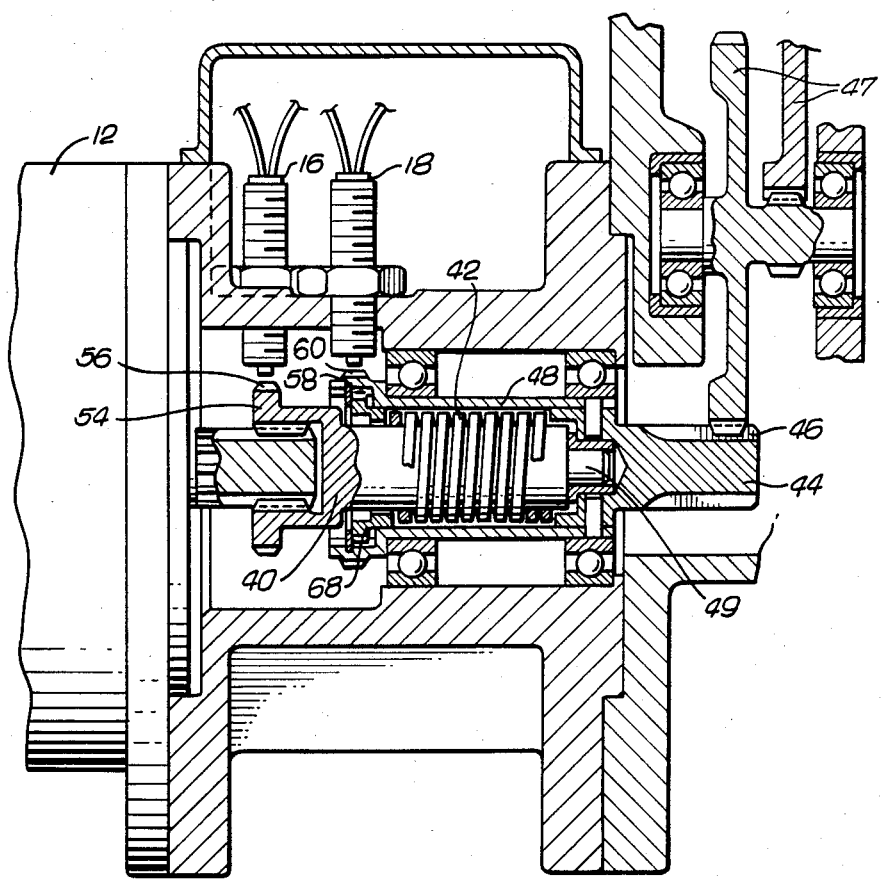
FIG. 2 is a longitudinal sectional view of the slip clutch employed in the invention, shown in relation to a drive motor and reduction gear.

As shown in the drawings for purposes of illustration, the present invention is concerned with torque-limiting devices used in conjunction with electric motors and other rotating machinery. In the past, slip-clutch devices for limiting transmitted torque have had the disadvantage of being unprotected against damage from slippage for an excessive time. Moreover, cutoff devices operative on the basis of a motor current threshold are too slow to prevent damage from excessive torque.

In accordance with the present invention, a slip-clutch device, indicated in FIG. 1 by reference numeral 10, is employed to limit the torque transmitted from a motor 12 to a load 14, and the slip-clutch device is itself protected by means operative in response to measurement of the amount and duration of clutch slippage. Coupled to the input side of the clutch 10 is a speed sensor 16, and coupled to the output side is another speed sensor 18. The sensors generate signals indicative of the rotational speeds of the input and output sides of the clutch 10. These signals are transmitted over lines 20 and 22, respectively, to a comparator 24, which generates a difference signal on line 26 to a timer 28.

In the simplest form of the invention, the timer is a countdown device that generates an output signal on line 30 only if no reset signal is applied to line 26 for a preselected time. So long as the input and output speeds of the clutch are the same, or differ by less than a predetermined amount, a reset signal is present on line 26 and the timer 28 never generates an output signal on line 30. However, as soon as the clutch slips to a selected degree for a predetermined time, the timer 28 generates an output signal, which is connected through an appropriate relay (not shown) to a motor cutoff switch 32, which disconnects power from the motor 12.

Figure 7:
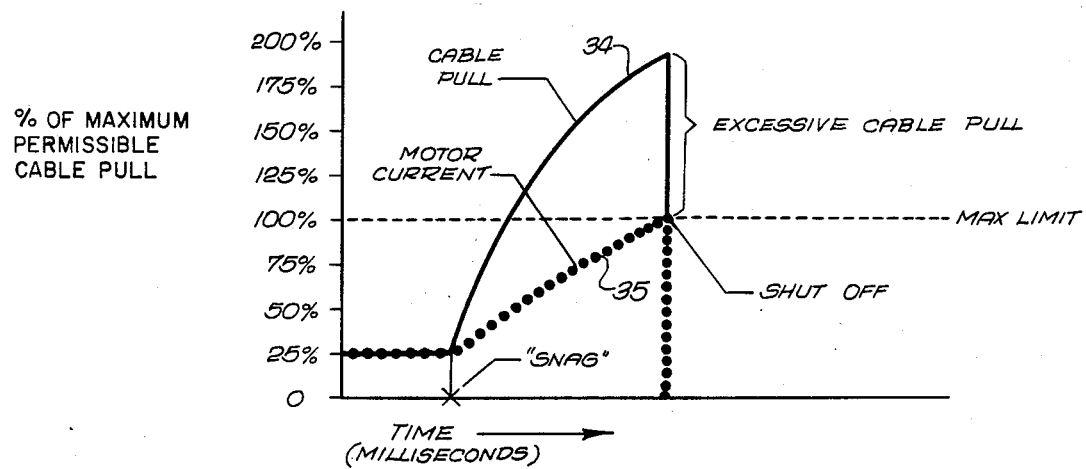
FIG. 7 is a graph showing the variation of motor current and cable pull on the application of a sudden load when using a motor current shutoff to limit torque.

The graph of FIG. 7 shows in curve 34 the variation of cable pull, which is proportional to transmitted torque, in a device that employs motor current to determine when to disconnect the motor. In a typical situation, the motor is initially running at a no-load and full-speed condition. Then, if a sudden load is applied to the winch cable, or if the cable becomes snagged, the motor current will not immediately increase to its shutoff value. The motor must first slow down to a speed at which the reverse voltage or "back e.m.f." of the motor is small enough to allow the current to rise to the shutoff value, as shown by curve 35. The substantial inertia of the motor results in a torque and cable pull greatly in excess of desired values.

Figure 8:
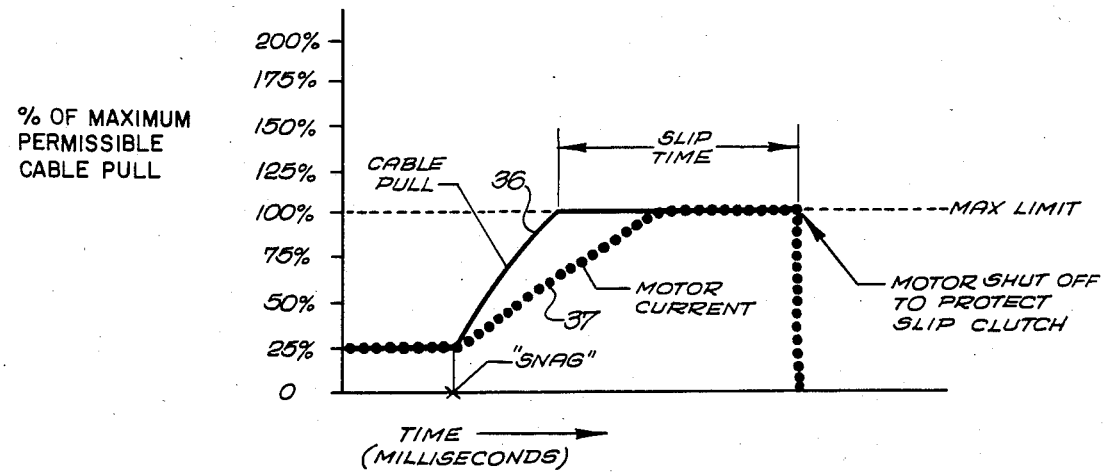
FIG. 8 is a graph showing the variation of motor current and cable pull on the application of a sudden load when using the device of the invention to limit torque.

FIG. 8 shows by way of comparison how the device of the invention overcomes this problem. When the cable pull, shown by curve 36, and motor current, shown by curve 37, begin to increase as a result of a sudden load or cable snag, the slip-clutch device 10 prevents the cable pull from exceeding a predetermined threshold level, and the clutch then begins to slip. Since the motor torque is then constant, the motor current soon also becomes constant. If the degree and time of clutch slip exceed predetermined values, the clutch 10 is protected by disconnection of power to the motor 12.

Although the slip-clutch device 10 may take any of a variety of forms, in the presently preferred embodiment of the invention the clutch is a wrapped-spring device, as shown in FIGS. 2-6. The clutch 10 includes an input shaft 40 secured to the shaft of the motor 12, and having an elongated portion around which is wrapped a spring 42, preferably of square or rectangular cross section. The spring 42 is closely wrapped, and in its free state has an internal diameter smaller than the diameter of the elongated portion of the input shaft 40. When fitted on the input shaft 40, the spring 42 engages the shaft in an interference fit, so that the two behave as a single integral part except in condition in which the clutch is slipping.

The clutch 10 has an output shaft 44, for connection to the load 14. The output shaft 44 has a geared end portion 46 to facilitate coupling to the load, through reduction gears 47, and a hollow cylindrical portion 48 with an internal diameter large enough to loosely receive the input shaft 40 and wrapped spring 42. A cylindrical stud 49 on the end of the input shaft 40 engages a corresponding bearing sleeve in the output shaft 44. A shoulder or driving dog 50 in the output shaft engages one end of the spring 42 when the input shaft 40 is engaged in the output shaft 44 and is driven in a forward direction, indicated by the arrow 51 in FIG. 4. Torque is transmitted from the input shaft 40 to the spring 42, through the interference fit, and then from the spring to the output shaft 44, through the drive dog 50.

If the torque transmitted between the input shaft 40 and the wrapped spring 42 is progressively increased, a point will be reached at which the spring will partially unwrap from the shaft. At a predetermined threshold torque, the spring 42 will unwrap sufficiently to cause relative slippage between the input shaft 40 and the output shaft 44. The clutch 10 will continue to transmit a relatively constant torque while the slippage is taking place.

For purposes of slip detection, the input shaft has an integral flange 54 on which are formed a plurality of peripheral teeth 56. Likewise, the output shaft 44 includes a flange 58 with a plurality of teeth 60. The two sensors 16 and 18 are, in this embodiment of the invention, electromagnetic pulse generators that employ the teeth on the respective flanges 54 and 58 to complete a magnetic circuit and thereby generate pulses in synchronism with the rate at which the teeth pass the sensors.

In the illustrative embodiment of the invention, the flange 54 on the input shaft 40 has nineteen teeth, and the flange 58 on the output shaft 44 has twenty-one teeth. The comparator circuit 24 in this embodiment includes means for generating a frequency difference signal. When the difference signal is zero, i.e. when there are signals of equal frequencies from the two sensors 16 and 18, the input shaft 40 is rotating at 21/19ths of the speed of the output shaft 44, or approximately ten percent faster. The circuitry for generating the difference signal may take any of a variety of forms. For example, it may include means for generating an output pulse only upon detection of two successive pulses from the output shaft sensor 18, with no intervening pulse from the input shaft sensor 16. The output pulses from this differencing circuitry may be used directly as a reset signal to the timer, which would not then be completely counted down until a ten-percent slippage was sustained for the preselected countdown time.

The slip-clutch 10 shown in FIGS. 2-6 may also be driven in the reverse direction. In this case, the drive dog 50 will be ineffective to engage the end of the spring 42, but there is a second drive dog 66 on an annular ring 68 located at the other end of the spring 42. The annular ring 68 is large enough not to interfere with rotation of the input shaft 40, and has external teeth or splines that engage with corresponding grooves on the inner surface of the cylindrical portion 48 of the outut shaft 44. In effect, then, the annular ring 68 acts as part of the output shaft 44. Torque in the reverse direction, indicated by the arrow 70 in FIG. 5, is transmitted from the input shaft 40 through the interference fit to the spring 42, and there through the drive dog 66 to the output shaft 44.

It will be appreciated from the foregoing that the present invention represents a significant advance in the field of torque-limiting devices. In particular, the invention provides a torque-limiting slip clutch that includes a self-protection feature to ensure that the clutch will not be damaged by slippage for an excessive time. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. An apparatus for protecting against excessive mechanical loads in rotating machinery, said device comprising:
    a fast-acting slip clutch means having an input shaft for connection to a drive motor and an output shaft for connection to a mechanical load, said slip clutch means being operative for mechanically limiting the torque that can be transmitted to the load by permitting slippage between said shafts without disengaging said output shaft from said input shaft;
    slip-sensing means for electronically detecting differences in speed between said input and output shafts and for generating a control signal in response to a predetermined relationship between said input and output shaft speeds; and
    automatic protective means, responsive to said control signal, for disconnecting power to said drive motor after a predetermined degree of slippage bewteen said input and output shafts has continued for a predetermined time period.

2. Apparatus as set forth in claim 1, wherein said automatic protective means is responsive to a predetermined degree of slip for a predetermined time to generate said control signal.

3. Apparatus as set forth in claim 1, wherein said torque-limiting means is a fast-acting slip clutch.

4. Apparatus as set forth in claim 3, wherein said fast-acting slip clutch includes:
    a wrapped spring in interference-fit engagement with said input shaft; and
    means connected to said output shaft for engaging one end of said spring;
    whereby said spring tends to unwrap from said input shaft and to slip relative to said input shaft when transmitting a sufficiently high torque.

5. Apparatus as set forth in claim 4, wherein said means connected to said output shaft includes separate means at each end of said spring, to permit transmission of torque in either direction of rotation.

6. Apparatus as set forth in claim 1, wherein said slip-sensing means includes:
    means for generating a first signal indicative of the speed of said input shaft;
    means for generating a second signal indicative of the speed of said output shaft; and
    means for generating a third signal from the first and second signals, indicative of the difference between the input shaft speed and the output shaft speed.

7. Apparatus as set forth in claim 6, wherein said automatic protective means includes:
    timing means for generating a control signal at the end of a predetermined period, if not reset before the end of the period;
    means for resetting said timing means in response to the third signal when the third signal is indicative of a speed difference less than some predetermined amount; and
    means responsive to the control signal, for disconnecting power from the motor and thereby protecting said torque-limiting means;
    whereby said automatic protective means is operative only after detection of a predetermined degree of slippage in said torque-limiting means for a predetermined time.

8. A slip-clutch device as set forth in claim 7, wherein:
    the first and second signals are periodic signals and the first signal has a frequency less than that of the second signal by a predetermined amount when there is no slip in said fast-acting clutch;
    the third signal is a periodic signal of frequency indicative of the frequency difference between the first and second signals, which difference will reduce to zero when a predetermined slippage rate is reached; and
    said timing means will be continually reset by the third signal unless the predetermined slippage rate has been reached.

* * * * *